United States Patent [19]
Saada et al.

[11] Patent Number: 5,253,295
[45] Date of Patent: Oct. 12, 1993

[54] PROCESS FOR AUTHENTICATION, BY AN OUTSIDE MEDIUM, OF A PORTABLE OBJECT CONNECTED TO THAT MEDIUM VIA A TRANSMISSION LINE AND SYSTEM FOR CARRYING OUT THE PROCESS

[75] Inventors: Charles Saada; André Oisel; François Lasnier, all of Louveciennes, France

[73] Assignee: Bull S.A., Paris, France

[21] Appl. No.: 991,198

[22] Filed: Dec. 16, 1992

[30] Foreign Application Priority Data

Dec. 19, 1991 [FR] France .................. 91 15813

[51] Int. Cl.$^5$ ............................................. H04K 1/06
[52] U.S. Cl. .................................. 380/23; 380/25
[58] Field of Search .................. 380/23, 24, 25; 235/380, 382.5

[56] References Cited

U.S. PATENT DOCUMENTS

| | | | |
|---|---|---|---|
| 4,679,236 | 7/1987 | Davies | 380/23 |
| 4,962,531 | 10/1990 | Sipman et al. | 380/23 |
| 4,969,188 | 11/1990 | Schobi | 380/23 |
| 5,153,919 | 10/1992 | Reeds et al. | 380/23 |
| 5,193,114 | 3/1993 | Moseley | 380/23 |

FOREIGN PATENT DOCUMENTS

| | | |
|---|---|---|
| 3905703 | 9/1990 | Fed. Rep. of Germany . |
| 2600189 | 12/1987 | France . |
| 2076615 | 12/1981 | United Kingdom . |

OTHER PUBLICATIONS

"Query Processing in LDV: A Secure Database System", Fourth Aerospace Computer Security Applications Conference, Dec. 1988, P. Dwyer, et al, pp. 118-124.

Primary Examiner—David C. Cain
Attorney, Agent, or Firm—Weingarten, Schurgin, Gagnebin & Hayes

[57] ABSTRACT

A process of authentication, by an outside medium, of a portable object connected to that medium via a transmission line and a system for carrying out the process. To authenticate a portable object (7) connected to a terminal linked to the outside medium by a transmission line, the outside medium (1) manages a control table (11) containing a non-secret piece of data ($N_7$) specific to each object that can be identified, as well as a parameter ($E_a$) and a result ($R_a$) entered in the control table during the preceding authentication of the object. A new parameter ($E_b$), produced by the medium during authentication, is used to calculate a new result ($R_b$) in the object. The old result is recalculated. If it matches the one in the table (11), the object is authenticated, and the new parameter ($E_b$) and result ($R_b$) are entered in the control table in place of the preceding ones. The process is well suited for use in protecting computer networks.

15 Claims, 4 Drawing Sheets

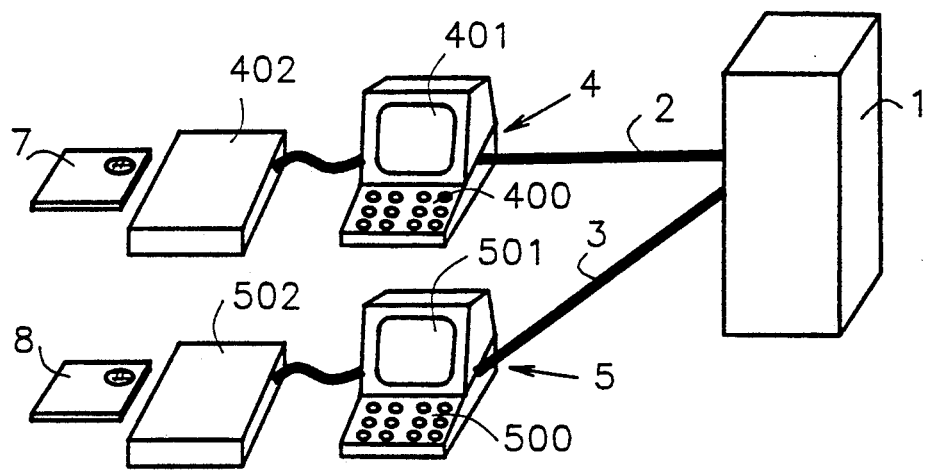
FIG. 1
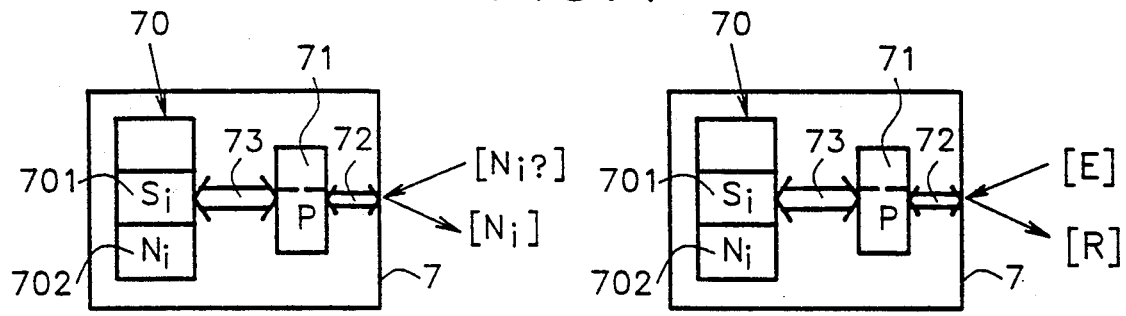
FIG. 2   FIG. 3
FIG. 6
| $N_i$ | $E_{vi}$ | $R_{vi}$ |
|---|---|---|
| $N_1$ | $E_{v1}$ | $R_{v1}$ |
| $N_2$ | $E_{v2}$ | $R_{v2}$ |
| $N_{(n-1)}$ | $E_{v(n-1)}$ | $R_{v(n-1)}$ |
| $N_n$ | $E_{vn}$ | $R_{vn}$ |

PROCESS FOR AUTHENTICATION, BY AN OUTSIDE MEDIUM, OF A PORTABLE OBJECT CONNECTED TO THAT MEDIUM VIA A TRANSMISSION LINE AND SYSTEM FOR CARRYING OUT THE PROCESS

FIELD OF THE INVENTION

The invention concerns a process for an outside medium to authenticate a portable object, such as an electronic microcircuit card, connected to that medium via a transmission line, and a system for carrying out the process.

BACKGROUND OF THE INVENTION

More and more electronic systems use portable objects, such as electronic microcircuit cards, especially to protect their applications.

For example, access control systems use portable objects. These systems include a device (connector and reader) to receive the portable objects; access is authorized when an approved portable object is presented. In this case, the operation performed is authentication of the portable object. In the field of access control, more sophisticated procedures can be used: not only authentication of an object, but also identification of its bearer can be required. In this particular case, the bearer of the object must enter his own data (confidential code, word or print recognition). Access control is therefore a basic application of portable object systems, which may be more or less complex.

Portable objects can be used in all data-processing systems, confidential or not. In this case, the portable objects can be used to authorize access to particular users, either by authentication of the object and/or identification of the bearer, and/or for certain highly confidential data-processing applications, the most sensitive data can conceivably be stored within one of the portable objects available to special users, or coded with algorithms contained in the objects.

Everything that has just been mentioned, while not exhaustive, is generally known to the expert, so there is no need to go into depth on this point.

Note then that for a system using portable objects to be reliable, it must be able to determine that a portable object connected to it for a moment was originally designed to grant an access right to the application created by the system, i.e., the system has to authenticate the portable object.

Generally speaking, most applications that use portable objects, such as microcircuit cards, take into account at least one secret key specific to each application. This key is prerecorded in all objects that can give access to the application and in all devices to which those objects may be connected, to obtain a service or access authorization within that application. These secret keys are known only to the approved bodies that issue the cards and run the equipment that interacts with them. In each of these applications, the equipment verifies beforehand that the object does indeed have the same secret key as the one it has, but does not in any way divulge the value of that key.

This verification is generally done through an exchange of information between the object and the equipment during a dialogue. The dialogue may consist of having a piece of equipment in the system generate a random number, which is then sent to the processing circuits of the object, then having the circuits calculate a result that is a function at least of the random number and a secret key pre-recorded in the memory of the object, transmitting this result to the equipment and comparing it with another result calculated by the equipment, which is at least a function of that random number and a secret key prerecorded in the equipment.

The object is verified or authenticated if the two results agree. Of course, this agreement can occur only if the secret keys stored in the object and in the equipment are identical, on one hand, and if the computational or processing algorithms are the same, on the other.

In order to prohibit a defrauder from producing phony objects, it is essential to keep the nature of the keys used a secret, particularly for equipment accessible to the public. Generally, the secret keys are recorded in a part of the memory of the equipment which is then locked to prohibit access from the outside; this part is accessible only internally through the equipment's processing circuits. However, it must be admitted that fraud, although limited and technically delicate, is always possible and conceivable, and that a defrauder will use sophisticated techniques to discover the secret, like laser reading the memory containing the keys, for example.

To fix this disadvantage, the French patent issued under number 2 600 189 in the name of the applicant, provides a process that no longer uses a secret key to the equipment, and replaces that key with information that is variable in time, while allowing the equipment to authenticate objects or cards that can cooperate with it. The use of variable information complicates the work of the defrauder, who would like to see the messages circulating in the system at any given time, since it is reasonable to assume that some of the data he is able to obtain during this observation will have changed when he wants to use it.

However, this process assumes that all of the objects that must be authenticated have the same secret key and the same processing algorithm, since a result previously calculated by one object must be able to be recalculated by another approved object.

Moreover, although the process described in this patent provides that the random number can be changed regularly, the same number is used at least twice, first when it is used to establish a reference result and secondly when it is used for subsequent authentication of another card.

The result is that a competent defrauder who sees an exchange of data between the outside medium and the portable object could attempt to reproduce that exchange to fool the system by logging on right after he sees it.

Such a risk of fraud by seeing an exchange of data exists particularly when the portable object is authenticated by a system in which there is no log-on protection and which can be logged onto physically. For example, this is true of computer networks, where authentication is done from a central computer, with the portable objects connected to each terminal; it is also true in access control systems on premises where a device for inserting the portable object is located at each access, and authentication is done by a central computer to which the various devices near each access are connected.

Another disadvantage, which is a consequence of the one mentioned first (same secret code and same algorithm in all portable objects) is the following: a set portable object can be used for only one application, since the use of a secret code specific to each application is what allows objects to be authenticated. In other words, the same person called upon to use several different systems must have as many objects as there are systems which the person must access.

Using a specific portable object for one application is conceivable if the application also implies modification of the memory of the portable object at certain times when it is used. For example, this is true of banking applications or all other types of applications that create or use files in the memory of the portable object.

On the other hand, if the application requires simple authentication of the object with no notable consumption of memory each time it is used, using a portable object specific to each use is obviously not the best solution.

DEFINITION OF TERMS

The terms "secret data", "secret piece of data", "secret" which appear hereinafter are synonymous with each other, as the term "non-secret data" is synonymous with "non-secret piece of data".

SUMMARY OF THE INVENTION

One initial goal of the invention is a process for authenticating portable objects by an outside medium that does not require the use of a specific secret code for the authentication device used, which consists of the outside medium.

A second goal of the invention is to permit authentication by an outside medium to which the portable object is connected via some kind of communication line, while prohibiting a defrauder from using the information that he may gather by logging onto that communication line.

A third goal of the invention is to allow any portable object with processing circuits that can make a calculation, taking into account outside data and secret data contained in its memory, to be used to give access to any applications, while affording them optimum security.

The invention concerns a process for an outside medium to authenticate a portable object that has: a portable medium inserted in a terminal connected to an outside medium via a transmission line; a portable object with processing circuits and a memory containing at least one secret piece of data accessible only by the processing circuits of the object; and a non-secret piece of data specific to that object. The invention is characterized by the fact that it involves:

having the object transmit its non-secret piece of data to the outside medium, having this piece of data go through the processing circuits in the outside medium, which contains a confidential control table managed by that medium, and find the result of a calculation made during the last authentication of that object and a first parameter taken into account in making that calculation, transmitting this first parameter to the object, having a second parameter generated and transmitted to the object via the processing circuits of the outside medium, having the processing circuits of the object calculate an initial result that takes into account at least the first parameter and the secret piece of data contained in that object, which is accessible only to the processing circuits of the object, having a second result calculated by the processing circuits of the object taking into account at least the second parameter and the secret piece of data contained in the object, transmitting the first and second results to the terminal, coding the first and second results as a unit in the terminal, so as to obtain a third result, then transmitting this third result to the outside medium via a transmission line, and decoding it in the outside medium to find the first and second results, comparing the first result of the decoding in the outside medium with the result of the calculation made during the last authentication of that object and stored in the control table, considering the object authentic if they match and replacing the result of the calculation made during the preceding authentication with the second result calculated during the authentication in progress and the first parameter with the second parameter, respectively, in the control table,.

According to another characteristic of the invention, the process has a preliminary phase, carried out under the supervision of the service provider and constituting an initial authentication of the object, each time that a new object must be validated to authorize access to an application run by the medium, said phase during which the processing circuits of the object are placed in contact with the processing circuits of the outside medium, and during which the non-secret piece of data specific to the object is transmitted to the outside medium, then entered in the control table, and during which a parameter is given to the object and a result is then calculated by the object, which takes into account at least this parameter and the same secret data used to calculate the first and second results, and during which the parameter and the result calculated from that parameter are stored in the control table and match the non-secret piece of data that is specific to that object.

A system for carrying out the process in the invention is characterized by the fact that: it includes an outside medium that manages a control table and at least one terminal connected to that outside medium via some kind of transmission line; the terminal has means of electrical connection and dialogue with the stationary portable object; that object contains, on one hand, a memory with at least one secret piece of data, and one non-secret piece of data specific to that object, and on the other hand, processing circuits to make calculations on that secret piece of data and on external parameters; the terminal also has means of coding the results supplied by the portable object and transmitting them to the outside medium; the outside medium has means of decoding the coded messages transmitted by the terminal and of entering information in the control table under certain conditions.

The invention is particularly advantageous, since any portable object containing a non-secret piece of data that is specific to it, and capable of coding outside parameters using an algorithm and a secret piece of data that it has in its memory can be authenticated and used as a means of access control for any application.

Now, most portable objects generally contain a specific non-secret piece of data: generally, it is the serial number of that object. And more and more objects have processing circuits and a secret piece of data accessible only by those processing circuits. The result is that, at the limit, any object, if it has been recorded or validated in a preliminary phase, can be used as a means of access control.

Indeed, it is not absolutely necessary for the algorithm contained in the object to have any correlation whatsoever with those of the terminal and the outside medium, since these are results calculated by the object, which are then coded in the terminal, transmitted to the outside medium and decoded in it. The decoding algorithm in the outside medium need only match the coding algorithm of the terminal.

BRIEF DESCRIPTION OF THE DRAWINGS

Other characteristics and advantages of the invention will appear below with the description of the figures in which:

FIG. 1 illustrates schematically a system for carrying out the process in the invention.

FIGS. 2 and 3 show the minimum elements that a portable object must have and the information-processing that it must be capable of performing to be able to be used with the invention.

FIG. 6 shows the control table at the end of the preliminary phase.

DESCRIPTION OF THE PREFERRED EMBODIMENT

Figure 4:
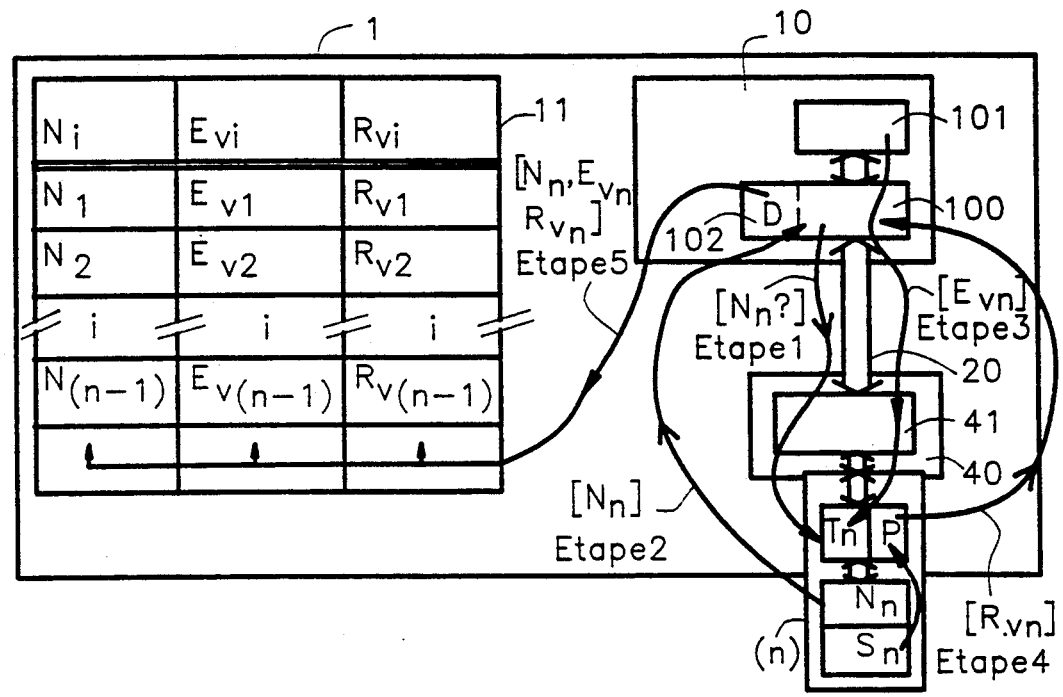
FIG. 4 illustrates an initial mode of carrying out the preliminary phase.

In FIG. 1, a system has a central unit 1, connected via transmission lines 2, 3 to several terminals, two of which 4, 5 are shown in the figure.

The unit formed in this way can perform one or more applications, depending on the programs recorded in the central unit 1 and the terminals 4, 5.

In the example, each terminal has at least one processing unit, not shown in the figure, and means of exchange and dialogue between a user and the processing unit. These means are, for example, a keyboard 400, 500, and a screen 401, 501 provided on each terminal respectively. In the known way, each processing unit is capable of running specific programs which are either recorded permanently in a memory of the processing unit, or loaded as needed.

In addition, according to this invention, means are provided so that access to all or part of the applications run by the system is prohibited to certain users under certain conditions.

For this purpose, each terminal 4, 5 has a coupling and connection device 402, 502 that allows it to dialogue with a portable object like a card 7, 8 with electronic microcircuits. This device will be called a coupling device in the rest of the description.

In the example illustrated, the coupling devices of the portable objects are shown outside the corresponding terminal. This is conceivable when the terminal and the coupling devices are being monitored by a representative of the service provider, for example.

In one variation, not shown but conceivable, when the terminal is not being monitored by the service provider, each coupling device 402, 502 of the portable objects is built into the corresponding terminal 4, 5, and the unit formed in this way is physically protected, for example, by shielding or by a safety device that sets off an alarm when someone tries to open it, or by any other means.

Thus, such an arrangement permits total access to all or part of the applications run by the central unit 1 or subject to prior authentication of a portable object that can perform a minimum number of functions and has a minimum of elements for doing so.

FIGS. 2 and 3 illustrate schematically the minimum number of elements that a portable object 7 must have to be able to be used in an authentication process in accordance with the invention. These figures also illustrate two types of information processing, respectively, that said object should be capable of performing.

The portable object shown in FIGS. 2 and 3 has memory elements 70, processing circuits 71 and means of connection and electrical communication 72 with the outside, composed of one or more connecting conductors. In the known way, these means make it possible to supply the circuits of the object with electrical power from the outside, and they permit an exchange of data between the object and the outside.

In the method of embodiment shown, the portable object is a card with electronic microcircuits. In this case, the memory elements 70, the processing circuits 71, and the means of communication 72 are built into a support, for example, made of plastic, in credit card format. The memory 70 and the processing circuits 71 are created in the form of monolithic electronic microstructures, so that access to the memory is controlled by the processing circuits 71. The means of communication 72 with the outside are composed of a combination of conductive wires, connected on one hand to the terminals of the electronic microstructure and on the other hand to contact ranges accessible from the outside through the coupling devices.

The connection between the processing circuits 71 and the memory 70 is shown in the diagram with an internal bus 73.

In order for an object illustrated in FIGS. 2 and 3 to be authenticated in accordance with this invention, its memory 70 contains at least two zones, the first 701, containing a secret confidential piece of data $S_i$, i.e., a piece of data that cannot be either read or changed from outside the object, but can only be used by its processing circuits 71, and a second zone 702 that contains a non-secret piece of data $N_i$ specific to that object that can be read from the outside.

Advantageously, the non-secret piece of data $N_i$ contained in this second zone 702 and used to implement the invention is the serial number of the object. This solution is advantageous because it prohibits two different objects from being marked with the same number in the control table, since the standards currently in effect are such that two cards manufactured by the same manufacturer, or two cards manufactured by different manufacturers cannot have the same serial number. Consequently, any card having a secret piece of data and a serial number can be used as a means of implementing this invention.

Moreover, the processing circuits 71 of the object contain a program P, in order to be able to perform certain operations when the object is connected to an appropriate medium, via a coupling device, such as one of those 402, 502 in FIG. 1.

The first operation that the processing circuits 71 of the object must be able to perform is illustrated by FIG. 2: on request from the outside medium, its processing circuits must be able to transmit to the outside medium the non-secret piece of data $N_i$ contained in the second zone 702 of its memory 70.

This is symbolized in FIG. 2 in the following way: the first arrow pointing toward the means of communication 72 with the outside shows the command entering the object (request for presentation of data $N_i$, marked [$N_i$?] in the figure), and the second arrow coming out of the object symbolizes the output of the data $N_i$ to the outside medium ([$N_i$] in the figure).

The second operation that the processing circuits 71 of the portable object must be able to perform is illustrated in FIG. 3. When requested by the outside medium, which presents a piece of data E (arrow [E] in the figure), the processing circuits 71 of the object must be able to calculate a result R, which is a function at least of this outside data E and the secret $S_i$ contained in the first zone 701 of the object's memory, so that $R=F(S_i,E)$ (arrow [R] in this figure). F is the special calculation function taken into account by the program P executed by the processing circuits 71.

Remember, the process in the invention includes a preliminary phase and an authentication phase. The preliminary phase makes it possible to record each portable object which should then permit access to the application run by the system. This phase consists of documenting a control table of the outside medium, monitored by the service provider, so as to validate each new object.

The preliminary phase consists of the following stages. First of all, when a new object is presented for its recording in view of its later authentications, a request is transmitted to the portable object by the outside medium, so that the object gives the medium the non-secret data that is specific to it. Then the outside medium generates a parameter which is transmitted to the object; the object calculates a result, which is a function of that parameter and the secret data contained in its memory and transmits this result to the outside medium. Lastly, the non-secret data specific to the object, the parameter and the result are entered on a control table that matches them up.

FIG. 4 illustrates a method of carrying out the preliminary phase, when the portable object (n) to be validated is in direct communication with the outside medium 1, or even when that object is connected to a terminal 40 connected to the outside medium 1 by a physically protected connection 20. This happens when the terminal is near the central unit, for example on the premises of the service provider. The terminal contains processing circuits 41.

The central unit 1 forming the outside medium has a processing module 10 with processing circuits 100 and a parameter generator 101, such as a random or pseudo-random number generator. In addition, the outside medium 1 is connected to terminals 4, 5 via some kind of transmission lines 2, 3, which were already described in connection with FIG. 1. Moreover, the outside medium 1 runs the control table 11 that was just mentioned.

The processing circuits 100 of the module 10 have a decoding program D recorded in a zone 102 of that module 10. The decoding program is taken into consideration by the processing circuits 100 if the preliminary phase is carried out when the portable object is connected to a terminal connected to the outside medium 1 by a non-protected line and during the later authentication phases.

In this FIG. 4, electrical connections existing between the various elements are shown by double arrows; the different flows of information that travel through these electrical connections during the preliminary phase to record an (n)th portable object are shown there by plain arrows indicating their point of departure from one element and their arrival at another; the main stages in the preliminary phase are mentioned.

Before the validation of this (n)th object, the control table 11 contains only information concerning the preceding $(n-1)$ elements, i.e., it contains the non-secret $N_i$ $n-1$ data specific to the $n-1$ objects already validated, and for each of these data, the control table 11 has a parameter $Ev_i$ and a result $Rv_i$ for each object that was calculated by taking into account the corresponding parameter. At each authentication of an object, the non-secret data $N_i$ specific to each object is not changed in the control table, but the value of the parameter $Ev_i$ and the value of the result $Rv_i$ associated with the object are changed, as will be explained later on.

During stage 1, the processing circuits 100 of the outside medium 1 transmit a request [$N_n$?] to the portable object (n) for the non-secret data $N_n$ specific to that object to be transmitted to the outside medium. This data is transmitted [$N_n$] during stage 2, for example. Next, during stage 3, a parameter $Ev_n$ is produced by the generating circuit 101 of the outside medium 1, and is transmitted to the processing circuits Tn of the object so that they can, in response, calculate a result $Rv_n$ that is a function of the secret data $S_n$ specific to the object and the parameter $Ev_n$ received, so that: $Rv_n=F(S_n,Ev_n)$. This result is transmitted to the outside medium 1 (stage 4) and, after that (stage 5), the non-secret data $N_n$ specific to the object, the parameter $Ev_n$ and the result $Rv_n$ are entered in the control table 11, which thus contains the elements shown in FIG. 6.

The preliminary phase must be monitored by a representative of the service provider, who must, inter alia, initialize the system so that at least the outside medium is placed in a working position so that information concerning a new object can be written into the control table.

Figure 5:
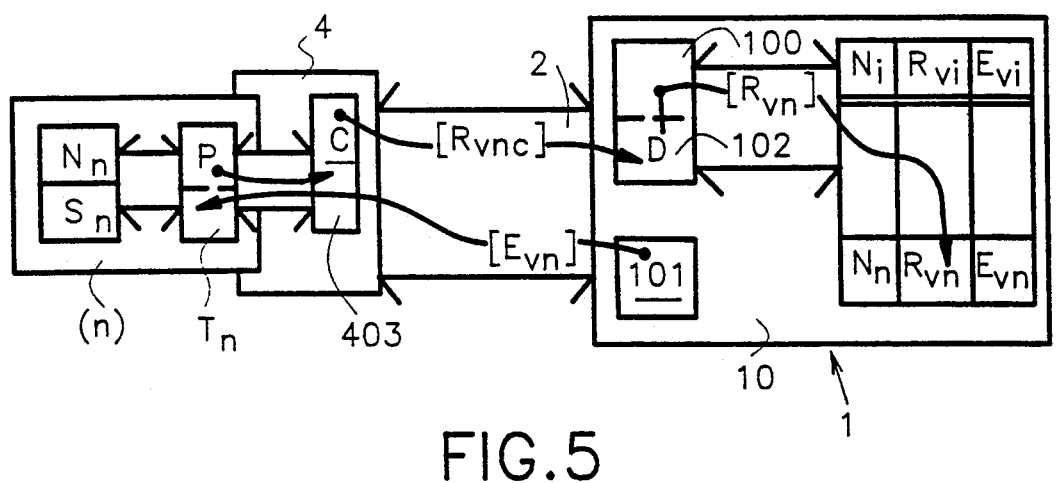
FIG. 5 illustrates a second mode of carrying out the preliminary phase.

FIG. 5 illustrates a variation used when the preliminary phase takes place when a portable object (n) is connected to a terminal 4 connected to the outside medium 1 via any kind of transmission line 2 that can thus be spied on. In this case, the result $Rv_n$, calculated by the processing circuits of the portable object is coded by the processing circuits of the terminal, which run a coding program C recorded in their memory, before being transmitted in coded form [$Rv_nc$] on the transmission line 2 to the outside medium. After it is received by the outside medium, the coded result is decoded by the processing circuits 102 of that medium 1, by running the decoding program D which was mentioned earlier. After decoding, the outside medium thus finds the initial result $Rv_n$, as it was calculated by the portable object, and can enter it in the control table 11 in correspondence with the non-secret data $N_n$ specific to the object and with the parameter $E_n$ used in calculating the result $Rv_n$ in the portable object.

On the other hand, the parameter $Ev_n$ is transmitted in clear from the outside medium 1 to the portable object (n) via the transmission line and the terminal 4; similarly, the non-secret data $N_n$ specific to the object is transmitted in clear between the object and the outside medium, via the terminal and the transmission line.

It was mentioned earlier that the non-secret data specific to the object used for recognition in the control table is the serial number of the object. However, one variation not illustrated uses not the serial number of the object, but a specific number for that application, generated, for example, by the outside medium 1 at the start of the preliminary phase, and entered, on one hand, by the processing circuits of the object in its non-secret memory when requested by the outside medium and then in the control table. This nevertheless entails additional memory consumption and requires that the processing circuits of the outside medium be configured to run and produce numbers intended for each object that must be authenticated.

As was mentioned, preferably the parameter used as a basis for calculation in the portable object is a random number found by a random number or pseudo-random number generator 101, which is part of the module 10 of the outside medium 1. Thus, a defrauder who watched the transmission lines and knew the parameters transmitted previously to portable objects connected successively to the outside medium could not tell ahead of time what parameter would be transmitted to the next portable object connected to the system.

The elements shown in FIG. 5 needed to carry out the preliminary phase when the portable object (n) is connected to one of the terminals 4, 5, which is linked to the outside medium via any kind of transmission line 2, 3 whatsoever are identical to those necessary for the authentication phase carried out in accordance with this invention.

Figure 7:
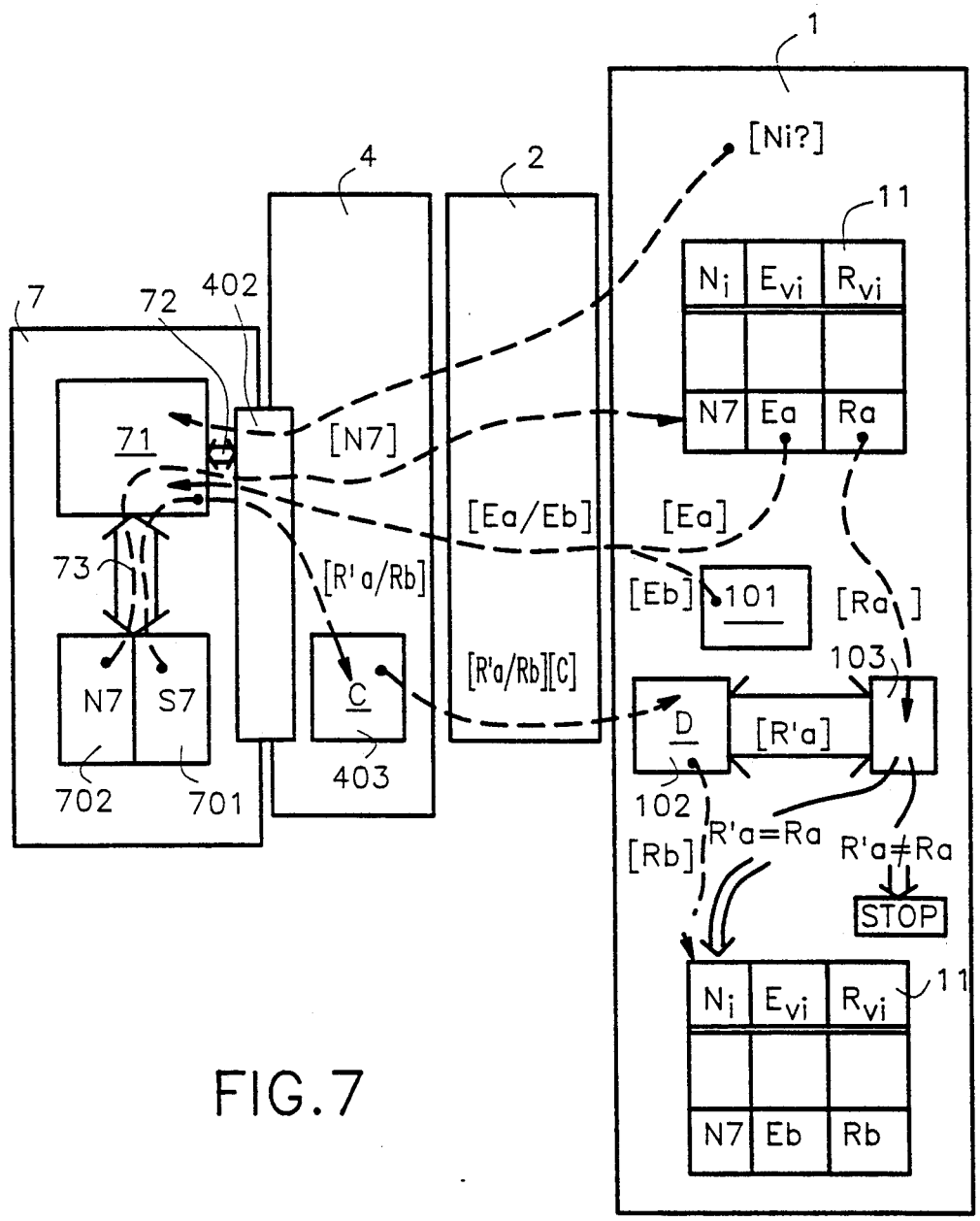
FIG. 7 illustrates the principle of the sequence in the authentication phase.

On the other hand, the flows of information or data which are shown in FIG. 5 differ from those that appear during the authentication phase. The latter are displayed in FIG. 7, which is structured so as to display from top to bottom a possible chronology of information exchanges within the system during the authentication phase, and the elements of the system that are used during each exchange.

The circuits of a portable object 7, such as a microcomputer card, are connected to those T of a terminal 4 via a coupling device 402. The processing circuits T of the terminal are placed in contact with the processing circuits 10 of the outside medium 1 via any kind of transmission line 2. A coding algorithm C is recorded in a memory zone 403 of the terminal 4 to code the data between the terminal and the outside medium. The processing circuits 10 of the outside medium run the control table 11. They include the random number generator 101, decoding circuits 102 and a comparison circuit 103 whose function will be explained later on.

The portable object 7 has a zone 701 with a secret piece of data $S_7$ specific to that object and a zone 702 with the non-secret piece of data $N_7$ specific to that object, such as its serial number.

Assuming that this object 7 was pre-recorded in a preliminary phase or already authenticated, the control table 11 contains information on that object: this includes its non-secret data $N_7$, a parameter Ea and a result Ra which were entered during the preliminary phase, if the object has not been authenticated since, or during the last authentication of that object as will be explained below.

After the object 7 has been connected, the processing circuits 10 of the outside medium transmit a request [N?] sent through the transmission line 2 and the processing circuits T of the terminal 4 to the portable object so that the specific non-secret piece of data $N_7$ is transmitted. In response, the processing circuits 71 of the object transmit [$N_7$] the non-secret data $N_7$ to the outside medium 1 via the terminal and the transmission line 2. When this non-secret data is received, the processing circuits 10 of the outside medium look in the control table and find the value of the parameter Ea and the result Ra entered that match this non-secret data, during the last authentication or validation of the object. At this stage, it should be noted that if the control table does not contain the value of the non-secret data for the object, because it has not been validated during a preliminary phase, the authentication process stops immediately.

After the non-secret data is received and the earlier parameter Ea and the result Ra are found, the generator 101 produces a second parameter Eb. The earlier parameter Ea and the second parameter Eb are then transmitted in clear [Ea/Eb] to the processing circuits 71 of the object, via the line 2 and the terminal. The processing circuits of the object then calculate two results, a first R'a, which is a function of the earlier parameter Ea and the secret data $S_7$ contained in the first memory zone of the object 701, and a second Rb, which is a function of the parameter Eb that has just been calculated by the generator 101 and the same secret data $S_7$ contained in the zone 701 of the object. These two results R'a and Rb are then transmitted to the processing circuits of the terminal in which the coding algorithm C contained in the specific zone 403 of the terminal is applied to them. A third single coded result [R'a/Rb][c], which is a function of the two results calculated by the object is then transmitted to the processing circuits 10 of the outside medium 1, via the transmission line 2 and is decoded there.

The decoding makes it possible to obtain the two results R'a, Rb, as they were calculated by the processing circuits 71 of the object before being sent to the terminal 4 for coding.

If the object used is authentic, and has therefore been used to document the control table during a prior operation, then the first result R'a calculated by taking into account the parameter Ea entered earlier in the control table matches the result Ra entered in the control table. The comparison circuits 103 contained in the processing circuits of the outside medium 1 make a comparison between this value of the result Ra contained in the control table II and the decoded result R'a which was calculated taking into account the same parameter.

If they match, the processing circuits 10 of the outside medium then consider the portable object 7 authentic. In this case, the second decoded result Rb, which must match the second result calculated by the object during this authentication is then entered in the control table 11 in place of the earlier result, and the parameter Eb set during the authentication session in progress, which was used to obtain this second result in the object, is also entered in place of the parameter Ea, which was entered during the earlier validation or authentication.

On the other hand, if they do not match, the authentication process stops. In effect, this means either that the object used is not authentic, or that an error was made during transmission between the terminal and the outside medium.

Nevertheless, one problem could occur, which is not inherent in the process in the invention, but depends solely on the coding/decoding procedure used. The security of the applications using such procedures actually often lies in the use of algorithms that take into account information or keys composed of a large number of bits, to prevent the keys from being able to be discovered easily. The result is that sometimes the system specifically designed to decode the message, i.e., the one that has the good keys and algorithms, takes a relatively long time (around several seconds or dozens of seconds) to decode the messages, which is not completely satisfactory to the user, albeit psychologically.

Figure 8:
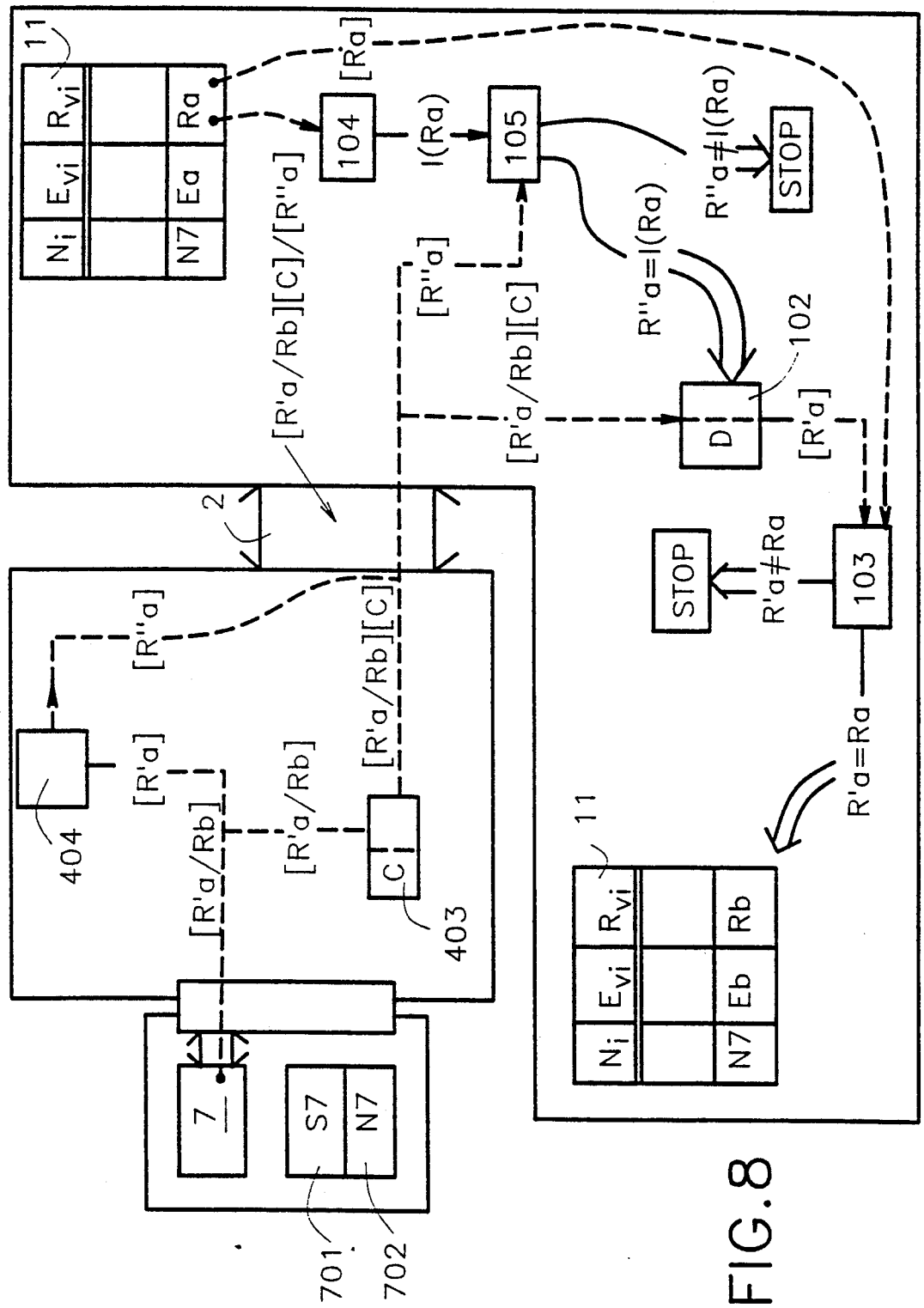
FIG. 8 illustrates a variation of the sequence in the authentication phase.

One variation in carrying out the process in the invention, whose main aspects are shown in FIG. 8, makes it possible to fix this potential disadvantage. The stages of this variation are identical to those for the variation in FIG. 7 up to the time when the two results R'a and Rb calculated for the portable object are transmitted to the terminal 4 for coding. They will therefore not be described again.

According to this variation, the first result R'a calculated from the secret contained in the object 7 and the parameter Ea stored in the control table during the last authentication of the object go into a dedicated part 404 of the circuits of the terminal 4 and are specially preprocessed to form an image R"a of this first result R'a, which is transmitted to the outside medium, along with the coded message [R'a/Rb][c] that came from coding the two results R'a, Rb which were just calculated by the portable object. Thus, the outside medium receives a global message [R'a/Rb][c]/[R"a] formed by the combination of the third result (coding of the two results calculated by the object) and the image R"a of the first result R'a.

After it is received, this global message is broken down by the transmission circuits of the outside medium in such a way as to separate the coded messages [R'a/Rb][c] and the image R"a from the first result R'a.

Next, following the same rules, some circuits 104 of the outside medium produce an image I(Ra) of the result Ra stored in the control table during the last authentication. This image is compared in the comparator 105 with the one R"a from the first result R'a If the object is authentic, the result Ra that is found in the control table is equivalent to the result R'a calculated on the basis of the parameter of the last authentication and consequently the image I(Ra) of this result Ra in the control table is identical to the one R"a of the first result R'a calculated during the authentication in progress.

If the verification is positive, then access is authorized, and the user can continue to dialogue with the system. Nevertheless, the decoding 102 of the coded part is used to find the two results calculated by the portable object during the authentication in progress, and a comparison 103 is made between the first result R'a calculated and the result Ra contained in the control table. If they match, the result Rb calculated from the parameter Eb produced by the generator 101 of the outside medium and the secret S7 contained in the object is entered in the control table in place of the result Ra stored during the previous authentication; moreover, the parameter Eb produced during the authentication in progress is entered in place of the parameter Ea entered during the preceding authentication. If they do not match, operations cease and the object is invalidated, since it is not authenticated.

Remember that temporarily authorizing connection after the images have been successfully compared has mainly a psychological effect on the honest user, who does not have to wait for all the verification operations to be over, but it does not prevent later verification of all the results from potentially causing the connection to be broken off.

In one embodiment, the image R"a of the first result R'a is formed by one part of this first result, for example, a set number of bits taken from among those that include this first result according to a specified rule. By way of example, if a result includes m bits, the first n can be taken, or n bits taken among the total m that this result includes, for example one or more successive bits out of two or three, or any other combination of bits.

In another embodiment, the image R"a of the first result R'a is obtained by conversion, preferably simple conversion, of the first result, and verification of that image, by the outside medium, consists of converting the result Ra stored in the control table the same as during the preceding authentication and comparing the image of the first result R'a with the image I(Ra) of the result Ra stored during the preceding authentication; these two images are identical if the object being used is authentic.

Thus, for example, the conversion of the first result Ra in order to obtain an image R"a can consist of splitting up this first result into at least two parts and performing a logic operation between these two parts, such as an EXCLUSIVE OR, an AND or an OR, and verification consists of performing the same operation on the result Ra stored during the preceding authentication, and then comparing them.

The portable object need not process parameters Ea, Eb simultaneously to provide the two successive results R'a, Rb. On the contrary, it is essential that the coding circuits 403 of the terminal be able to process the two results calculated by the portable object in an overall way, to give a single coded message that is a function of these two results.

The parameters or data used by the portable objects are generally in 32-bit or 64-bit formats, i.e., relatively small formats. That is why it is preferable and known, at the time of coding, for the results transmitted by the portable object to be combined in the terminal with random data for transmission on the line 2 to artificially increase the number of bits or bytes transmitted, in order to prevent a defrauder from quickly discovering the decoding rules.

The coding or decoding algorithms chosen depend on the application used. Thus, symmetrical or secret key algorithms (TELEPASS, DES type) can be used where a single key is used both by the coding circuits of the terminal and by the decoding circuits of the outside medium. In this case, the security of the application lies in the confidentiality of the key on both sides, and assumes particularly that it is impossible to access the circuits of the terminal to try to read the key.

That is why, preferably, when it is difficult to monitor the terminals while they are not in use, the process in the invention uses a public key algorithm that uses an asymmetrical coding/decoding system, such as the RSA system created by RIVEST, SHAMIR and ADLEMAN. Remember that in a public key system, the coding and decoding operations are different, so that it is completely conceivable to distribute the coding procedure while keeping the decoding system secret, without threatening the security of the system. Such a system is less vulnerable than a secret key system.

Thus, the coding algorithm can be recorded with no special precautions in the coding circuits 403 of the terminal, provided, of course, that the processing circuits of the outside medium are protected so that the decoding algorithm and the control table remain confidential. This poses no problems, since the outside medium 1 will generally be monitored by the service provider or any other authority, given the fact that there will generally be a central computer.

Moreover, a system for implementing the process in the invention makes it possible to use portable objects that may have a symmetrical means of coding, but have very high physical security, since each portable object must contain a secret piece of data $S_i$ in a zone 701 accessible only by the processing circuits 71 of the object.

Of course, other related operations, within the scope of the expert, may be necessary to carry out the process in the invention. In particular, the portable objects, such as microcomputer cards, can contain different masks and/or have different memory mapping for the same mask, so that the structure of the memory and the dialogue between these objects and the outside medium can be different from one object to another. Consequently, before any other operation, whether in the preliminary phase or the authentication phase per se, the outside medium will preferably start a test procedure to determine how the object in its presence is mapped, so as to make its subsequent requests in an appropriate way. The terminal must also be adapted to be able to be used with any type of mask.

By way of example, for a given object, the serial number can be entered at a certain address in the memory of the object, while it is entered at another address for another object. Now, for certain types of masks (and therefore processing programs entered in the objects), the request to furnish the serial number to the outside medium can be a read command specifying the address where the serial number is located. The outside medium must therefore know the memory mapping and/or the mask it is faced with in order to make its request appropriately.

Similarly, other requests must be appropriate. Thus, computing commands from the parameters Ea, Eb contained in the control table or produced during the authentication procedure in progress by the random number generator 101, will have to be adapted to the mask and therefore to the program contained in the portable object.

One possible and particularly interesting application of the invention is, for example, the authentication of any portable objects whatsoever to give access to any information processing system, complex or not, set up on a network around a computer or central computer (computer networks). Thus, each user of such a network could conceivably be able to access the applications (information processing, access to the premises, process command, etc.) run by that network, not with a specific card, but with any card that they have (bank card or other), which has processing circuits, of course, after the card has been recorded in a preliminary phase. In this case, each terminal is either one of the processing units on the network (if it is a complex computer network) or a simplified device, and the outside medium is composed of a central computer, or a device dedicated to the authentication of the objects.

Other modifications, adaptations or applications of the process in the invention are of course within the scope of the expert, and these particular aspects need not be described in greater detail.

We claim:

1. A process for authentication of a portable object (7) by an outside medium (1), in which the portable object is connected to a terminal (4,5) linked to the outside medium (1) via a transmission line (2,3), and the portable object contains processing circuits and a memory with at least one secret piece of data ($S_i$, $S_n$, $S_7$); and one non-secret piece of data ($N_i$, $N_n$, $N_7$) specific to that object, comprising the steps of:

having that object transmit the non-secret piece of data specific to that object to the outside medium;

having the processing circuits (10) in the medium use that piece of data and look in a control table (11) managed by the outside medium to find the result (Ra) of a calculation made during the last authentication of that object and a first parameter (Ea) taken into account to make that calculation;

having this first parameter (Ea) transmitted to the object;

having a second parameter (Eb) generated by a generator (101) of the outside medium and transmitted to the object;

having the processing circuits of the object calculate a first result (R'a) taking into account at least the first parameter (Ea) and the secret piece of data contained in the object;

having those same processing circuits calculate a second result (Rb) taking into account at least the second parameter (Eb) and the secret piece of data;

transmitting the first and second results to the terminal, coding the unit composed of the first and second results in the terminal, so as to obtain a third result and transmitting this third result to the outside medium via the transmission line (2,3);

decoding this third result in the outside medium to find the first and second results;

comparing the first result of the decoding in the outside medium with the result of the calculation made during the last authentication of this object and stored in the control table (11); and considering the object authentic if it matches and, in that case, replacing the result of the calculation made during the preceding authentication in the control table with the second result decoded by the outside medium, and replacing the first parameter with the second parameter generated during the authentication in progress.

2. A process according to claim 1, further comprising a preliminary phase step constituting an initial authentication of the object monitored by the service provider each time that a new object must be validated to authorize access to an application run by the outside medium, during which the processing circuits of the object are connected to the processing circuits of the outside medium, and during which the non-secret piece of data specific to the object is entered in the control table, and during which a parameter (En) is given to the object and a result is then calculated by the processing circuit of the object taking into account at least that parameter and the secret data stored in the object, and during which the parameter and the result thus calculated are stored in the control table, and matched with the non-secret piece of data specific to the object.

3. A process according to claim 2, wherein the preliminary phase is carried out by connecting the portable object directly to the outside medium.

4. A process according to claim 2, wherein the preliminary phase is carried out by connecting the portable object to one of the terminals (4,5) designed to receive objects and authenticate them; the result calculated by the object is transmitted to the terminal, then coded in it; the coded result is transmitted to the outside medium via the transmission line, then decoded in the outside medium, before being entered in the control table and matched with the non-secret data and the parameter produced by the processing circuits of the outside medium.

5. A process according to claim 1, further comprising the step of having the processing circuits of the terminal produce, according to a set rule, an image (R"a) of the first result (R'a), after this first result is received by these processing circuits and transmit that image to the outside medium (1) in combination with the third result (R'a/Rb)(c); and after the outside medium (1) receives the unit composed of the third result and the image of the first result, it separates that image and the third result, and produces, according to the same set rule, the image (I(Ra)) of the result (Ra) contained in the control table since the last authentication of the object, then compares those two images and if they match authorizes at least temporary access to the application run by the outside medium, before it decodes the third result so as to confirm the authenticity of the object if the first result extracted from the decoding matches the result (Ra) contained in the control table since the preceding authentication of that object.

6. A process according to claim 5, wherein the image (R"a) of the first result (R'a) and the image (I(Ra)) of the result (Ra) stored in the control table during the last authentication are composed respectively of one part of those results, which are therefore identical if the object is authentic.

7. A process according to claim 5, wherein the image (R"a) of the first result (R'a) and the image (I(Ra)) of the result (Ra) stored during the previous authentication are obtained by converting those results respectively.

8. A process according to claim 7, wherein the conversion of either the first result (Ra) in order to obtain its image (R"a) or the result stored during the preceding authentication, is done by splitting up this result into at least two parts and by performing a logic operation, such as an EXCLUSIVE OR, an AND or an OR between these two parts.

9. A process according to claim 1 wherein the parameter (Ea,Eb) produced by the outside medium during the preliminary phase or during the authentication phases and then stored in the control table until the next authentication is a random number.

10. A process according to claim 1, wherein the non-secret piece of data (Ni) specific to each object entered in the control table (11) during the preliminary phase, then retransmitted during each authentication to find the information on the object in that table is the serial number of the object.

11. A process according to claim 1 wherein the non-secret piece of data (Ni) specific to each object is produced during the preliminary phase by the processing circuits of the outside medium, before being entered in the control table and into the memory of the object, upon request by the processing circuits of the outside medium (1).

12. A process according to claim 1, further comprising the step using first (R'a) and second (Rb) results for coding in the terminal, in order to obtain the third result ([R'a/Rb][c], and an asymmetrical or public key algorithm for decoding this third result in the processing circuits of the outside medium.

13. A process according to claim 1, wherein as soon as an object is connected to the outside medium, it has that medium organize a test phase, so as to recognize the mapping of that object and/or determine the type of program it contains, so as to establish later dialogues appropriately.

14. A system for authenticating a portable object, such as a microcircuit card containing processing circuits and a memory with at least one piece of secret data accessible only to the processing circuits of the object, and a non-secret piece of data specific to that object, characterized by the fact that it includes at least one terminal (4,5) connected to an outside medium (1) via any kind of transmission line, and by the fact that the terminal and the outside medium have means of carrying out the process according to claim 1.

15. A system according to claim 14, wherein the outside medium (1) comprises an information processing network, set up around a computer.

* * * * *